United States Patent
Maruyama et al.

(10) Patent No.: US 6,610,435 B1
(45) Date of Patent: Aug. 26, 2003

(54) FUEL CELL WITH REDUCED GAS LEAKAGE

(75) Inventors: Teruo Maruyama, Aichi-ken (JP); Hiroshi Okazaki, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 196 days.

(21) Appl. No.: 09/676,477

(22) Filed: Oct. 2, 2000

(30) Foreign Application Priority Data

Sep. 30, 1999 (JP) .......................................... 11-279757

(51) Int. Cl.$^7$ ................................................. H01M 8/10
(52) U.S. Cl. ........................................................ 429/34
(58) Field of Search ............................. 429/28, 30, 34, 429/35, 36, 37

(56) References Cited

U.S. PATENT DOCUMENTS

| | | | | |
|---|---|---|---|---|
| 6,057,054 A | * | 5/2000 | Barton et al. ............... | 29/623.1 |
| 6,080,503 A | | 6/2000 | Schmid et al. | |
| 6,316,139 B1 | * | 11/2001 | Uchida et al. ................ | 429/36 |
| 6,440,597 B1 | * | 8/2002 | Mizuno ....................... | 429/34 |

FOREIGN PATENT DOCUMENTS

| | | |
|---|---|---|
| DE | 197 13 250 | 10/1998 |
| DE | 199 60 516 | 7/2000 |
| JP | 9-17437 | 1/1997 |
| JP | 2000-182639 | 6/2000 |
| WO | WO 92/22096 | 12/1992 |

\* cited by examiner

*Primary Examiner*—Randy Gulakowski
*Assistant Examiner*—Monique Wills
(74) *Attorney, Agent, or Firm*—Oblon, Spivak, McClelland, Maier & Neustadt, P.C.

(57) ABSTRACT

A fuel cell which provides less gas leakage, no deformation of the electrodes, and low producing cost is formed of a plurality of electrode units, each having an oxidant electrode, a fuel electrode, and a solid polymer electrolyte membrane sandwiched by the oxidant and fuel electrodes. The solid polymer electrolyte membrane has a larger area than the oxidant and fluid electrodes, and has an electrode contacting portion and an outer peripheral portion projecting from the electrode contacting portion. A gasket covers the outer peripheral portion of the solid polymer electrolyte membrane. A plurality of separators separates the electrode units, the electrode units and separators being stacked to form a fuel cell.

6 Claims, 6 Drawing Sheets

(A-A)

FUEL CELL WITH REDUCED GAS LEAKAGE

BACKGROUND OF THE INVENTION

1. Field of the Invention

This invention relates to a fuel cell, and more particularly to an fuel cell in which gas leakage is reduced, the deformation of the electrode is prevented, and the assembly cost is reduced.

2. Description of the Related Art

Air contamination caused by exhaust gases from automobiles is a critical problem. Electric vehicles have been viewed as a solution to this problem since they do not produce air contaminants at an exhaust pipe. Yet, electric vehicles have not seen consumer acceptance, in part because of their limited range and the necessity of frequent recharging of their batteries.

In recent years, automobiles equipped with fuel cells generating electricity by reverse reaction of electrolysis using hydrogen and oxygen have been developed as environmentally acceptable vehicles which discharge only water into the atmosphere. A solid polymer electrolyte type fuel cell operating at low temperature is the most promising type for use on automobiles.

The solid polymer electrolyte type fuel cell is generally structured as a stack of many single cells. A stack of such cells comprises an electrode unit including a solid polymer electrolyte membrane sandwiched by two electrodes (a fuel electrode and an oxidant electrode), and separators having gas flowing conduits for the fuel gas or the oxidizer gas sandwiching the electrode unit.

The following reaction occurs by the contact of the hydrogen in the fuel gas with the catalyst at the fuel electrode:

$$2H_2 \rightarrow 4H^+ + 4e^-.$$

$H^+$ is transferred through the solid polymer electrolyte membrane to reach the oxidant electrode catalyst and to generate water by combining with the oxygen in the oxidizer gas. That is:

$$4H^+ + 4e^- + O_2 \rightarrow 2H_2O.$$

A large volume of gas is required to be used in the catalysts to perform the above described reaction effectively. Leakage of the fuel gas and the oxidizer gas at any place except the electrode contacting portion must be prevented. To this end, Japanese Patent Laid open Publication H 09-17437 (published on Jan. 17, 1997) discloses a gasket disposed between separators and a solid polymer electrolyte membrane adhered to the electrodes. Similarly, WO 92/22096 discloses a gasket adhered to electrodes and a solid polymer electrolyte membrane in one unit overlapped with the electrodes and the solid polymer electrolyte membrane.

However, the conventional fuel cell structures have certain disadvantages. Since a large number of parts is required in Japanese Patent Laid-open Publication H 09-17437, the gasket is structured as one unit with the separator. Generally, the rubber gasket is printed on the separator by injection molding or compression molding to make the gasket and the separator into one unit. In this case, some means is required to prevent the flow of the gasket forming material such as rubber into the conduit introducing and discharging the gas from a manifold to a cell. The technical means employed for this is to mold the conduit under a nest, and to remove the nest after molding. However, it is difficult to completely stop the flow of the gasket material into the conduit, and so an additional process to remove the nest is required. This is a fatal drawback for mass production.

In the structure of WO 92/22096, where the gasket is overlapplingly adhered into one unit with the electrode and the solid polymer electrolyte membrane, the gas leakage can be reduced by covering the solid polymer electrolyte membrane with the electrode and the gasket when the gasket is assembled in an overlapped state with the electrode and the solid polymer electrolyte membrane. However, a predetermined form cannot be obtained without a relatively large load being applied on the electrode when it is adhered with adhesive agent in the actual producing process, which may lead to the deformation of the electrode and deteriorate the power generation capability.

Since the gasket is here adhered to a part of the solid polymer electrolyte membrane at a distance from the electrode contacting portion, there may be gas leakage from the solid polymer electrolyte membrane between the electrode contacting portion and the gasket.

SUMMARY OF THE INVENTION

Accordingly, it is an object of this invention to provide a sealing structure of a fuel cell electrode with less gas leakage, with no deformation of the electrode, and which has a low production cost.

According to a feature of the invention, the above and other objects are achieved by a fuel cell having an electrode unit comprising an oxidant electrode, a fuel electrode, and a solid polymer electrolyte membrane sandwiched by the oxidant and fuel electrodes, the solid polymer electrolyte membrane having a larger area than the oxidant and fluid electrodes, whereby the solid polymer electrolyte membrane has an electrode contacting portion and an outer peripheral portion projecting from the electrode contacting portion; and a gasket covering the outer peripheral portion of the solid polymer electrolyte membrane.

Since the gasket completely covers the entire periphery of the solid polymer electrolyte membrane, gas does not leak from the solid polymer electrolyte membrane and the gas leakage can be reduced. Also, since the gasket does not overlap the electrodes, deformation of the electrodes does not occur.

In addition, since the solid polymer electrolyte membrane, the electrodes and the gasket are in one unit, it is possible to reduce the number of parts. In consequence, the assembly of the fuel cell is facilitated, the assembling time can be reduced, and the production cost for the fuel cell can be reduced.

According to another feature of the invention, a reinforcement portion is disposed in the periphery of the gasket. Since the shape of the gasket is maintained by the reinforcement portion, the handling of the gasket during assembling is facilitated, the assembling time can be reduced and the cost for producing the fuel cell can be reduced. When the solid polymer electrolyte membrane is stacked with the electrodes as a unit, the deformation and destruction of the sealing portion due to the deformation of the gasket can be prevented.

According to another feature of the invention, respective supply holes and discharge holes for the fuel gas, the oxidizer gas and the cooling water are provided in the gasket. The fuel cell includes the gasket between the separators, a supply manifold and a discharge manifold formed from the supply holes and the discharge holes provided on the gasket, and fluidically communicating with the supply holes and the discharge holes for the fluid (the fuel gas, the oxidizer gas, and the cooling water) provided on the separator, which enables sealing of the fluid.

According to another feature of the invention, a bead shaped projecting portion encloses at least one of the electrode contacting portion, the supply holes and the discharge holes in the gasket. The fluid can thereby be tightly sealed by the contact of the bead shaped projecting portion to the separator.

According to another feature of the invention, a reinforcement portion is disposed in the gasket and is composed of a continuous or intermittent wire or a thin rectangular plate enclosing the solid polymer electrolyte membrane. Since the entire gasket can be reinforced with a simple structure, an excellent reinforcement capability and lower cost can be assured.

According to another feature of the invention, the gasket is elastic, and the gasket and the projecting portion are formed in one unit. Since the gasket is elastic, it can fully contact the separator without allowing any gap therebetween, and the fluid can be completely sealed. Since the gasket and the projecting portion can be produced in one process, the producing cost can be reduced.

According to another feature of the invention, one of the bead shaped projecting portions disposed to enclose the electrode contacting portion is provided inside the peripheral portion of the solid polymer electrolyte membrane. Since the bead shaped projecting portion compresses the solid polymer electrolyte membrane, the solid polymer electrolyte membrane is tightly sealed to the gasket.

According to another feature of the invention, the gasket formed as one unit. Since the gasket is structured as one unit, the fluid can be tightly sealed. Also, the production cost can be reduced since the gasket is produced in a single process.

According to another feature of the invention, a portion covering the peripheral portion of the solid polymer electrolyte membrane on the gasket is divided into two portions at the surface of the solid polymer electrolyte membrane. The division of the portion covering the solid polymer electrolyte membrane enables it to be bonded with an adhesive agent.

According to another feature of the invention, the entire gasket is divided into two substantially identical parts at the surface of solid polymer electrolyte membrane. The division of the portion covering the solid polymer electrolyte membrane enables it to be bonded with an adhesive agent.

According to another feature of the invention, at least one of lid portions of a gas inlet and a gas outlet supplying and discharging the fuel gas and the oxidizer gas respectively from the supply holes and the discharge holes of the fuel gas and the oxidizer gas to the electrodes is connected or attached to the gasket fluid-tightly. Connecting or adhering lid portions and the gasket simultaneous with the assembling of the fuel cell enables shortening the assembling time and reducing the production cost.

BRIEF DESCRIPTION OF THE DRAWINGS

These and other objects and features of the invention will be more apparent and more readily appreciated from the following detailed description of preferred embodiments of the invention with the accompanying drawings, in which:

FIG. 4 (b) is a cross sectional view of an electrode unit of the first embodiment of this invention;

DESCRIPTION OF THE PREFERRED EMBODIMENTS

Figure 1:
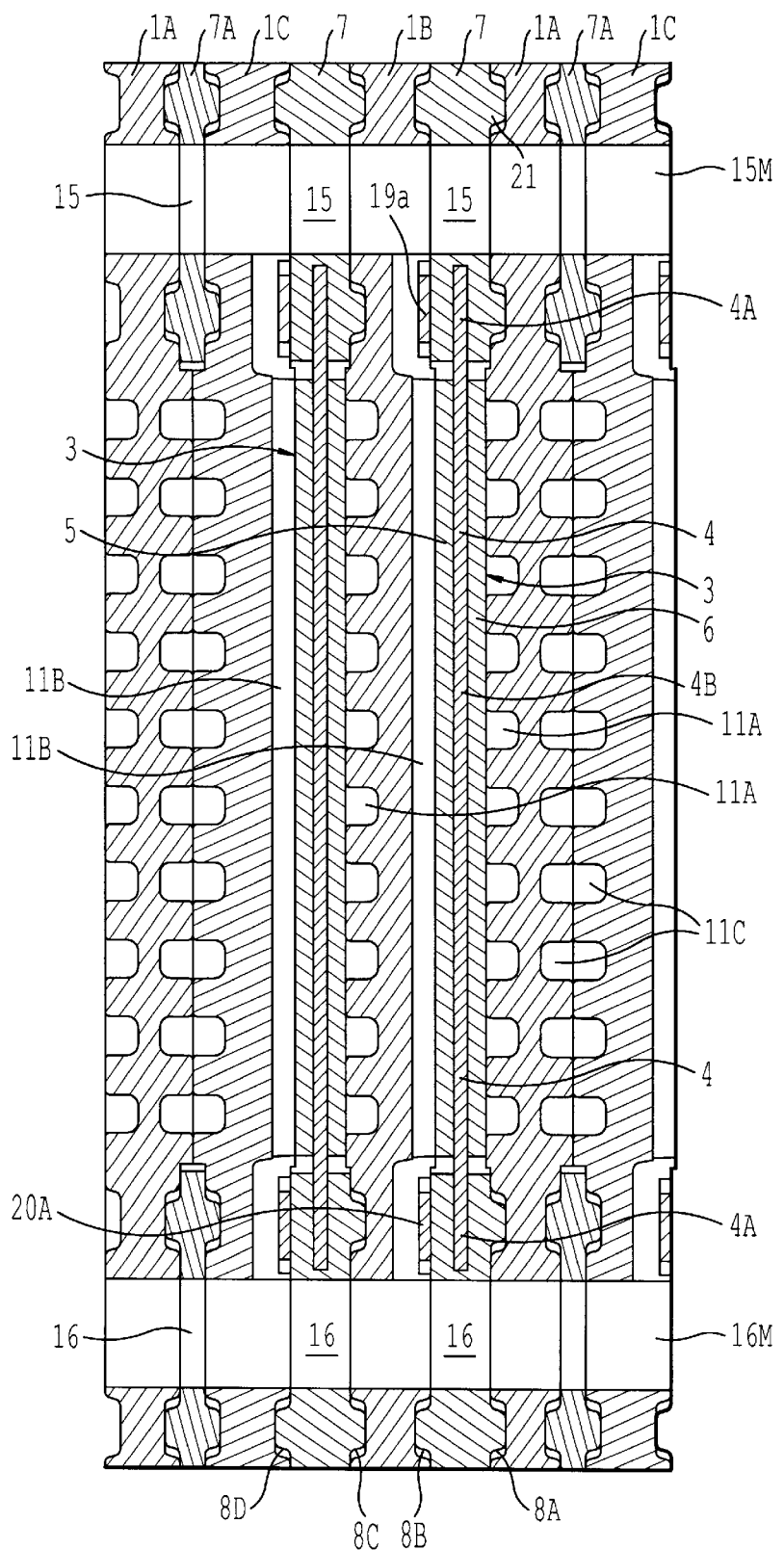
FIG. 1 is a partial cross sectional view illustrating a fuel cell of a first embodiment according to this invention.

The embodiments of a fuel cell of this invention are described as follows referring to FIGS. 1 through 7. FIG. 1 shows a partial cross sectorial view of a fuel cell of this invention. The fuel cell is formed of a plurality of stacked units made up of elements as set forth below.

A solid polymer electrolyte membrane 4 is sandwiched between two electrodes, an oxidant electrode 5 and a fuel electrode 6. The size of the solid polymer electrolyte membrane 4 is larger than that of the oxidant electrode 5 and the fuel electrode 6. The outer peripheral portion of the solid polymer electrolyte membrane 4 protrudes beyond the respective outer peripheries of the oxidant electrode 5 and the fuel electrode 6. The protruding portion of the solid polymer electrolyte membrane 4 is herein referred to as a solid polymer electrolyte membrane marginal portion 4a.

A gasket 7, which is an elastic member made of ethylene propane rubber (EPDM), is formed on the solid polymer electrolyte membrane marginal portion 4a by injection molding. An electrode unit 3 is comprised of the solid polymer electrolyte membrane 4, the oxidant electrode 5, the fuel electrode 6 and the gasket 7.

The electrode unit 3 is supported by a separator 1A and a separator 1B, or a separator 1B and a separator 1C. A unit is structured by assembling the components in the order of the separator 1A, an electrode unit 3, the separator 1B, an electrode unit 3 and the separator 1C. The fuel cell is structured as a stack of these units.

One gasket 7 is supported between a peripheral groove 8a of the separator 1A and a peripheral groove 8b of the separator 1B. Another gasket 7 is supported between a peripheral groove 8c of the separator 1B and a peripheral groove 8d of the a separator 1C. By this structure, the fuel gas, the oxidizer gas, and the cooling water are sealed at these locations. Yet another gasket 7a disposed between the separator 1A and the separator 1C seals the fuel gas, the oxidizer and the cooling water at these locations.

Fuel gas supply conduits 11a convey the fuel gas between the separator 1A and the electrode unit 3, and between the separator 1B and the electrode unit 3, and are disposed on the separator 1A and the separator 1B, respectively. Air supply conduits 11b convey air (oxidizer gas) between the separator 1B and the electrode unit 3, and between the separator 1C and the electrode unit 3, and are disposed on the separator 1B and the separator 1C, respectively. There is no electrode unit 3 between the separator 1A and the separator 1C. A cooling water supply conduit 11c conveys cooling water and is disposed between the separator 1C and the separator 1A.

Figure 2:
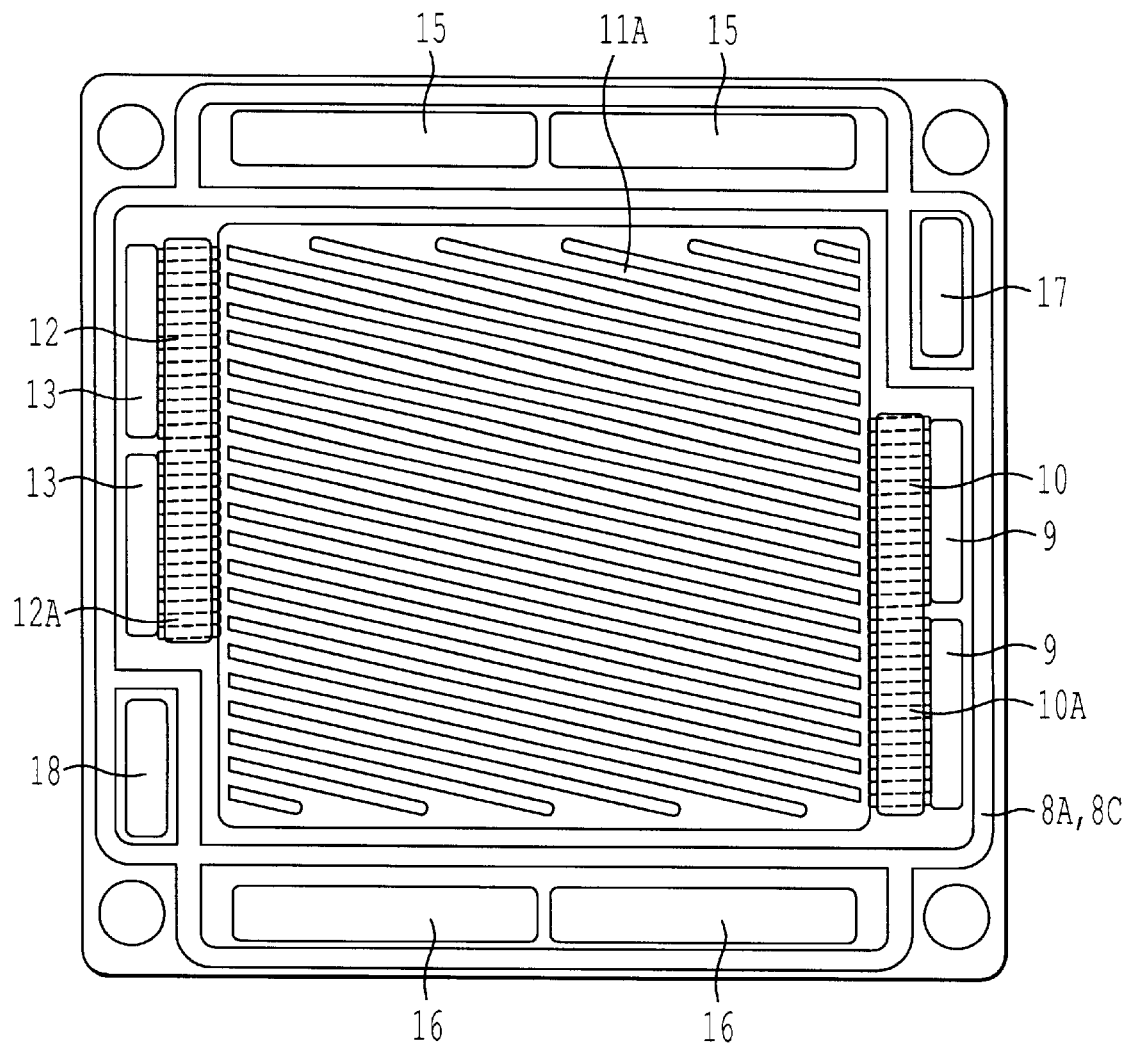
FIG. 2 is a front view of a separator 1A and a separator 1B of the first embodiment viewed from fuel cell electrode side.
Figure 3:
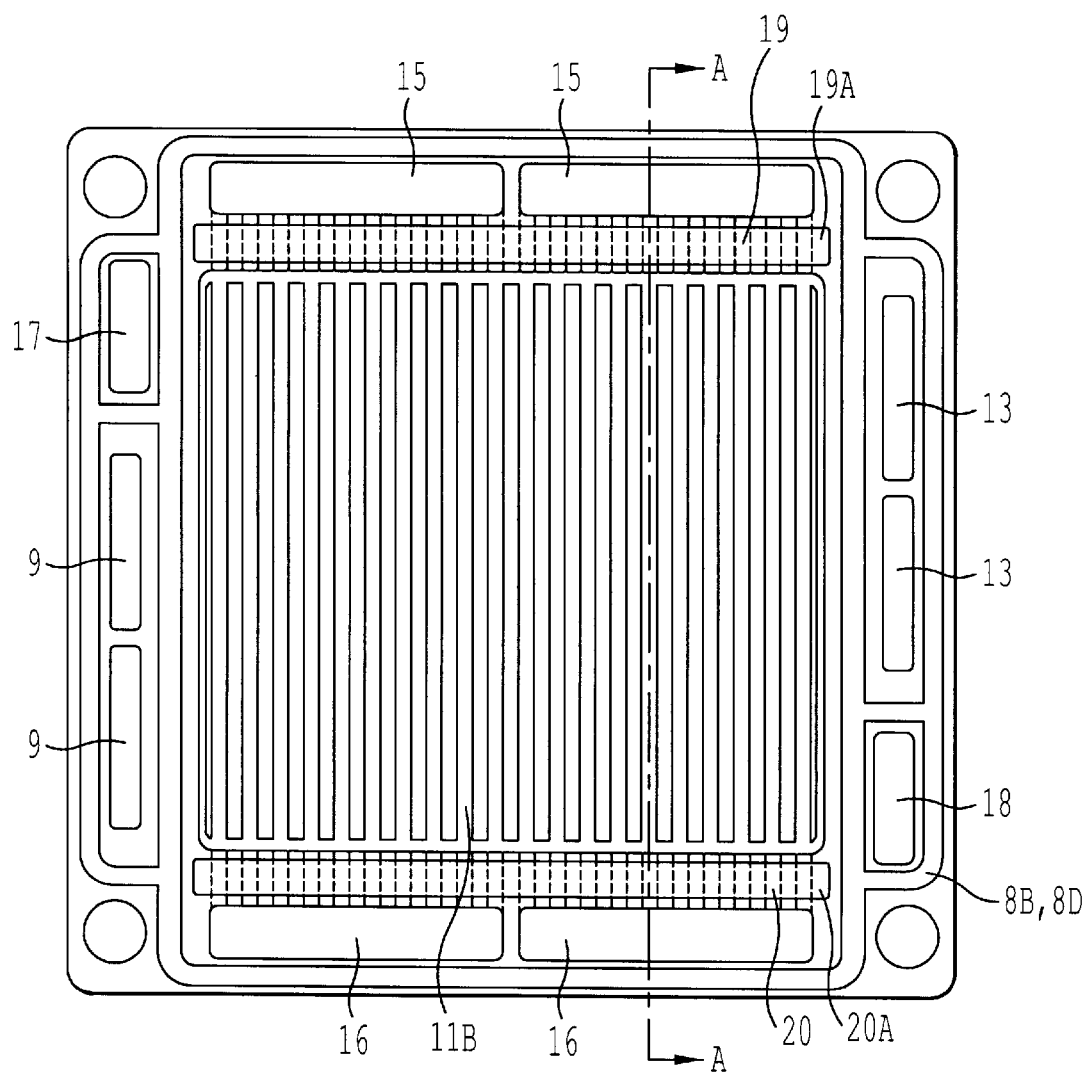
FIG. 3 is a front view of a separator 1B and a separator 1C of the first embodiment of this invention viewed from oxidizer electrode side.

FIG. 2 shows a front view of the separator 1A or 1B of the first embodiment, viewed from the fuel electrode 6 side. FIG. 3 shows a front view of the separator 1B or 1C of the first embodiment, viewed from the oxidant electrode 5 side. The separators 1A, 1B, and 1C include fuel gas supply holes 13, a fuel gas inlet 12, fuel gas supply conduits 11a, a fuel gas outlet 10, fuel gas discharge holes 9, air supply holes 15, air discharge holes 16, a cooling water supply hole 17, a cooling-water discharge hole 18, an air inlet 19, an air supply conduit 11b, and an air outlet 20.

In FIG. 2, the peripheral groove 8a is disposed on the separator 1A and the peripheral groove 8c is disposed on the separator 1B. In FIG. 3, the peripheral groove 8b is disposed on the separator 1B and the peripheral groove 8d is disposed on the separator 1C. A lid portion 12a is disposed on the fuel gas inlet 12 to prevent the gas flow from being blocked by the gasket 7. Lids 10a, 19a, and 20a are similarly disposed on the fuel gas outlet 10, the air inlet 19, and the air outlet 20, respectively.

Figure 4A:
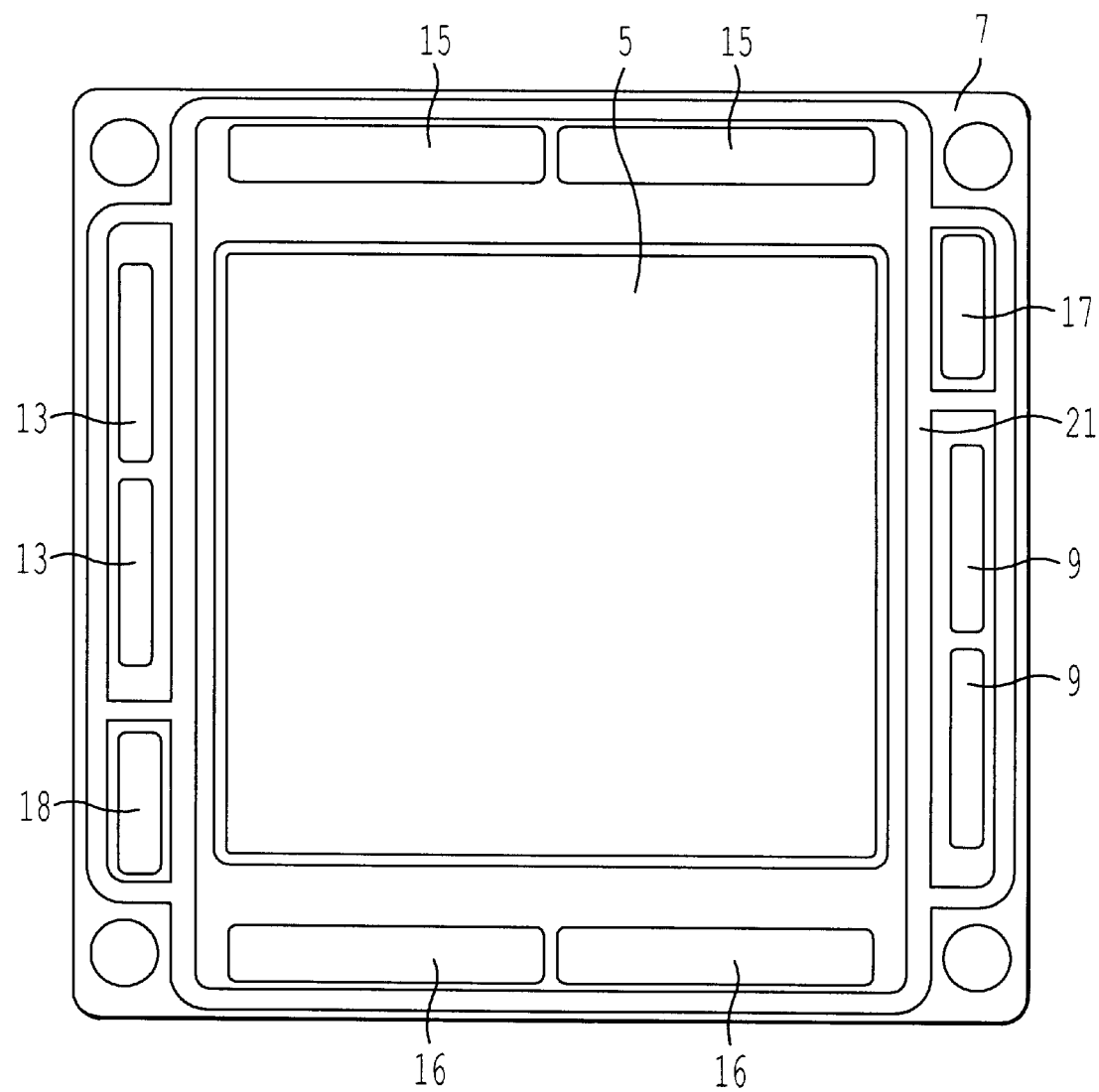
FIG. 4 (a) is a front view of an electrode unit of the first embodiment of this invention, viewed from air supply conduit side.
Figure 4B:
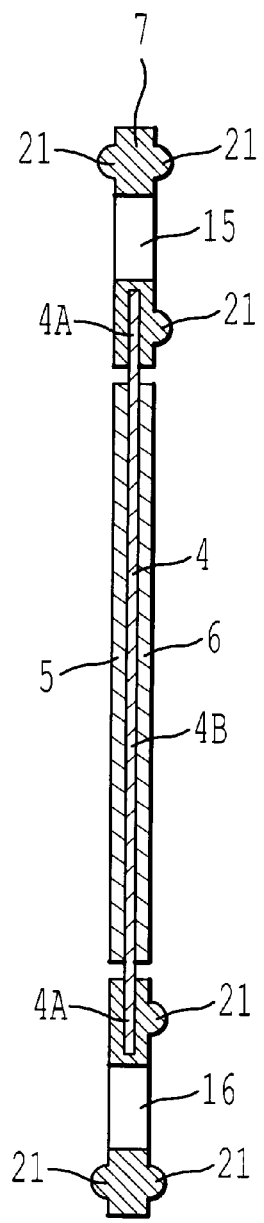

FIG. 4 (a) shows a front view of the electrode unit 3 of the first embodiment viewed from the air supply conduit 11b side. FIG. 4(b) shows a cross sectional view of the electrode unit 3 of the first embodiment. The gasket 7 forms the fuel gas supply holes 13, the fuel gas discharge holes 9, the air supply holes 15, the air discharge holes 16, the cooling water supply hole 17 and the cooling water discharge hole 18. The gasket 7 wraps around the solid polymer electrolyte membrane marginal portion 4a which borders the electrode contacting portion 4b of the solid polymer electrolyte membrane 4.

On the front and the back of the gasket 7 is disposed a bead shaped projecting portion 21 sealing the fuel gas, air and the cooling water holes. A part of the projecting portion 21 is disposed inside the marginal periphery of the solid polymer electrolyte membrane 4 for completely sealing the gas in the electrode. Another part of the projecting part 21 is provided for surrounding the fuel gas supply holes 13.

Further part of the projecting portion 21 is provided for surrounding the fuel gas discharge holes 9, the cooling water supply holes 17, and the cooling water discharge holes 18 respectively. Different parts of the projecting portion 21 are provided for surrounding the air supply, holes 15, the air discharge holes 16, the electrode 5 and the electrode 6.

The separators 1A, 1B, 1C and the fuel gas supply holes 13 of the gasket 7 define the fuel gas supply manifold. The fuel gas discharge holes 9, the air supply holes 15, the air discharge holes 16, the cooling water supply holes 17 and the cooling water discharge holes 18 define the fuel gas discharge manifold, the air supply manifold 15M, the air discharge manifold 16M, the cooling water supply manifold, and the cooling water discharge manifold, respectively, when these components are assembled as the fuel cell.

The fuel gas supplied to the fuel cell flows into the fuel gas supply manifold and is introduced to the fuel gas supply conduits 11a via the fuel gas supply holes 13 of the separators 1A, 1B, and the fuel gas inlet 12. Hydrogen in the fuel gas flowing in the fuel gas supply conduits 11a is used for the reaction at the fuel electrode. The rest of the fuel gas not used in this reaction is delivered to the fuel gas discharge holes 9 of the separators 1A, 1B via the fuel gas outlet 10. The fuel gas is then discharged out of the fuel cell by flowing through the fuel gas discharge manifold.

The air supplied to the fuel cell flows in via the air supply manifold 15M and is supplied to the air supply conduits 11b via the air supply holes 15 of the separators 1B, 1C, and the air inlet 19. The oxygen in the air flowing in the air supply conduits 11b is used for the reaction at the oxidant electrode 5. The rest of the air not used in this reaction is discharged to the air discharge holes 16 of the separator 1B, 1C via the air outlet 20. The air is delivered out of the fuel cell via the air discharge manifold 16M.

The solid polymer electrolyte membrane 4 has aeration formed by porous material. The solid polymer electrolyte membrane 4 is moistened to improve the electrochemical reaction of the fuel cell. The moistening increases the aeration of the solid polymer electrolyte membrane 4. Nonetheless, since the solid polymer electrolyte membrane marginal portion 4a protruding from the electrode contacting portion 4b of the solid polymer electrolyte membrane 4 is completely wrapped by the gasket 7 and has no direct contact with the gas, the fuel gas or the air does not leak from the solid polymer electrolyte membrane 4. Since the solid polymer electrolyte membrane has no gas leakage, the gas leakage is lessened and the electric generation capability of the fuel cell is improved.

Since the gasket is formed as a single unit in the first embodiment of this invention, a gap is not formed; in consequence, the fluid (the fuel gas, the air, and the cooling water) is completely sealed. In addition, the assembly cost is reduced because the gasket is formed in only one process such as injection molding.

Figure 5:
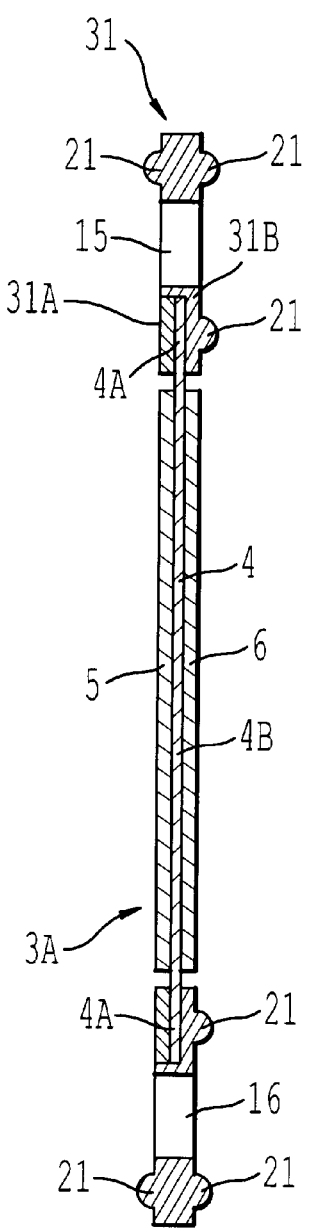
FIG. 5 shows a cross sectional view of an electrode unit of a second embodiment.

FIG. 5 shows a cross sectional view of an electrode unit 3A of a second embodiment of this invention. The same numerals are used for the identical members or parts as in the first embodiment of this invention, and the explanation thereof will be omitted. Although the structure of a gasket 31 is identical to the gasket 7 of the first embodiment of this invention in appearance, the portion wrapping the solid polymer electrolyte membrane marginal portion 4a is divided into two parts at the surface of the solid polymer electrolyte membrane marginal portion 4a. The gasket 31 is structured by firmly bonding together gasket members 31a and 31b with epoxy bonding agent. The solid polymer electrolyte membrane marginal portion 4a is held between the gasket member 31a and 31b. The gasket member 31a is slightly larger than the solid polymer electrolyte membrane marginal portion 4a.

The gasket member 31b includes the fuel gas supply holes 13, the fuel gas discharge holes 9, the air supply holes 15, the air discharge holes 16, the cooling water supply holes 17, and the cool-Ing water discharge holes 18. An L-shaped portion fitting gasket i-nember 31a is included in the gasket member 31b. The beads shaped projecting portion 21 sealing the fuel gas, the air, and the cooling water is disposed on the gasket member 31b.

Since the portion wrapping the solid polymer electrolyte membrane marginal portion 4a is divided into two parts in the second embodiment of this embodiment, the process for wrapping the solid polymer electrolyte membrane marginal portion 4a can be done by cementing and so becomes easier. The assembling process does not require large devices injection molding. The resilience of the rubber material used in the gasket members 31a and 31b also applies a holding force to retain the solid polymer electrolyte membrane without using an adhesive agent.

Figure 6:
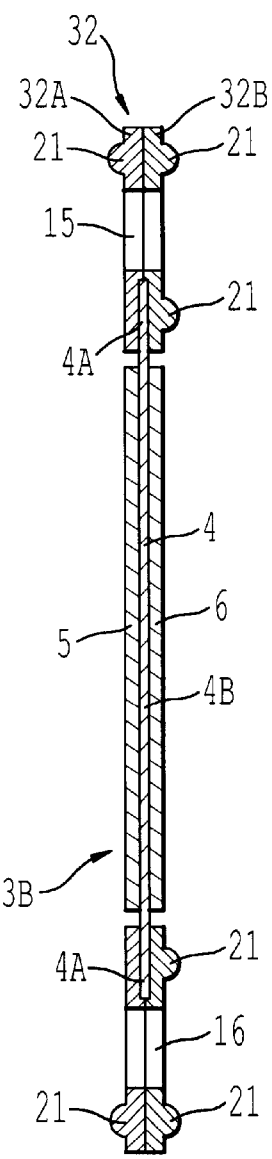
FIG. 6 shows a cross sectional view of an electrode unit of a third embodiment.

FIG. 6 shows the cross sectional view of an electrode unit 3B of a third embodiment of this invention. The same numerals are used for components identical to those of the first embodiment of this invention, and the explanation thereof will be omitted. Although the gasket 32 is identical to the gasket 3 of the first embodiment of this invention in appearance, it is divided into two parts at the surface of the solid polymer electrolyte membrane.

The gasket 32 is made by cementing the gasket members 32a and 32b with epoxy adhesive agent. The solid polymer electrolyte membrane marginal portion 4a is wrapped by the inner peripheries of the gasket members 32a and 32b. The gasket members 32a and 32b are made by completely dividing the gasket 32 into two portions at the surface of the solid polymer electrolyte membrane.

Like the second embodiment of this invention, since the portion wrapping the solid electrolyte membrane marginal portion 4a is divided, the process of assembling can be done by bonding and becomes easier. The process does not require to use large devices such as injection molding devices. Since the gasket is made of two complete portions, the process for bonding is facilitated. The resilience of the rubber material used in the gasket members 32a and 32b also applies a holding force to retain the solid polymer electrolyte membrane without using an adhesive agent.

Figure 7:
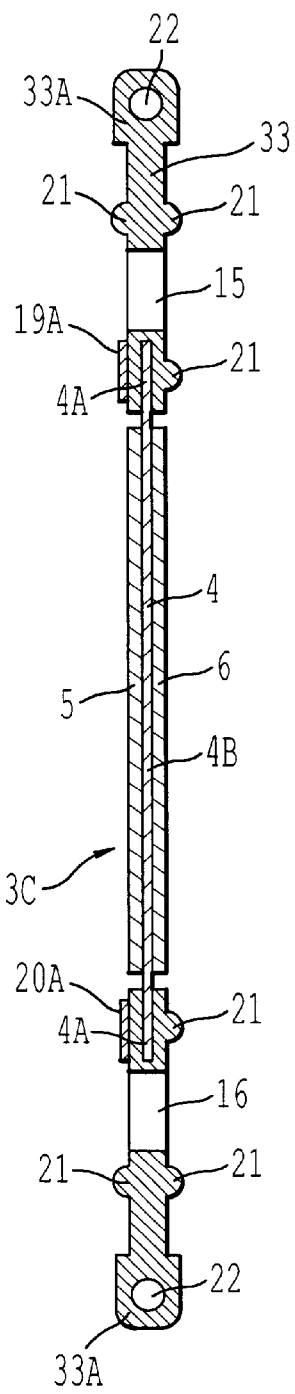
FIG. 7 shows a cross sectional view of an electrode unit of a fourth embodiment.

FIG. 7 shows a sectional view of an electrode unit 3C of a fourth embodiment of this invention. The differences between the fourth embodiment and the first embodiment are that a gasket of the fourth embodiment is provided with a reinforcement portion 33a, a lid of a fuel gas inlet 10a, a lid of a fuel gas outlet 12a, a lid of an air inlet 19a, and a lid of an air outlet 20a. Identical numerals are used for other components identical to those of the first embodiment.

A reinforcement portion 33a is provided on the periphery of a gasket 33 of the fourth embodiment. In the reinforcement portion 33a, a reinforcement member 22 made from a continuous stainless steel wire is embedded so that the reinforcement member 22 extends around the periphery of the gasket 33.

Since the shape of the gasket 33 is maintained by the reinforcement member 22, the handling during assembling becomes easier, the assembling time can be reduced and the cost of producing the fuel cell can be reduced. When the gasket is stored as the electrode unit 3C, the reinforcement member 22 protects the gasket 33 from bending and prevents the deformation of the sealed portion.

The material of reinforcement member 22 is not limited to stainless wire. Any metal wire with rigidity is usable. Also, the reinforcement member 22 is not limited to being a wire. A thin rectangular plate is also usable. Also, the reinforcement member 22 need not be continuous. A plurality of intermittently arranged reinforcement members 22 is also usable if the members are disposed around the periphery of the gasket 33 and enclose the solid polymer electrolyte membrane 4. Since the simple structure mentioned above can reinforce the whole gasket, high reinforcement capability and the cost reduction can be achieved.

The lid portion 19a of the air inlet 19 and the lid portion 20a of the air outlet 20 are adhered to the gasket 33 with epoxy adhesive. The lid portion 12a of the fuel gas inlet 12 and the lid portion 10a of the fuel gas outlet 10 (not shown) are adhered to the gasket 33 with epoxy adhesive.

Since the bonding of the lid portions 10a, 12a, 19a and 20a to the gasket 33 is performed simultaneously with assembling the electrode in the fourth embodiment of this invention, the assembling time can be reduced and the cost can be reduced.

It is intended that the foregoing detailed description be regarded as illustrative rather than limiting, and that it is understood that the following claims including all equivalents are intended to define the scope of the invention.

What is claimed is:

1. An electrode unit of a fuel cell, comprising:

an oxidant electrode;

a fuel electrode;

a solid polymer electrolyte membrane sandwiched by the oxidant and fuel electrodes, the solid polymer electrolyte membrane having a larger area than the oxidant and fluid electrodes, whereby the solid polymer electrolyte membrane has an electrode contacting portion and an outer peripheral portion projecting from the electrode contacting portion;

a gasket covering the outer peripheral portion of the solid polymer electrolyte membrane; and a reinforcement member disposed in a periphery of the gasket.

2. An electrode unit of a fuel cell, comprising:

an oxidant electrode;

a fuel electrode;

a solid polymer electrolyte membrane sandwiched by the oxidant and fuel electrodes, the solid polymer electrolyte membrane having a larger area than the oxidant and fluid electrodes, whereby the solid polymer electrolyte membrane has an electrode contacting portion and an outer peripheral portion projecting from the electrode contacting portion;

a gasket covering the outer peripheral portion of the solid polymer electrolyte membrane; and a bead shaped projecting portion disposed on the gasket, the bead shaped projecting portion enclosing at least one of the electrode contacting portion, the supply holes and the discharge holes.

3. The electrode unit according to claim 1, wherein the reinforcement member comprises one of a metal wire or a rectangular plane plate at least partially enclosing the solid polymer electrolyte membrane.

4. The electrode unit according to claim 2, wherein the gasket is made of elastic material and wherein the gasket and the projecting portion are formed as one unit.

5. The electrode unit according to claim 2, wherein the bead shaped projecting portion is disposed inside the periphery of the solid polymer electrolyte membrane.

6. An electrode unit of a fuel cell, comprising:

an oxidant electrode;

a fuel electrode;

a solid polymer electrolyte membrane sandwiched by the oxidant and fuel electrodes, the solid polymer electrolyte membrane having a larger area than the oxidant and fluid electrodes, whereby the solid polymer electrolyte membrane has an electrode contacting portion and an outer peripheral portion projecting from the electrode contacting portion;

a gasket covering the outer peripheral portion of the solid polymer electrolyte membrane; and supply holes and discharge holes for fluid flow of a fuel gas, an oxidizer gas, and cooling water provided on the gasket, wherein at least one of lid portions of fuel and oxidant gas inlets and outlets are connected to the gasket.

* * * * *